United States Patent [19]

Feliz

[11] 4,222,449
[45] Sep. 16, 1980

[54] STEP-CLIMBING WHEEL CHAIR

[76] Inventor: Jack M. Feliz, 2110 Southridge Dr., Palm Springs, Calif. 92262

[21] Appl. No.: 913,549

[22] Filed: Jun. 8, 1978

[51] Int. Cl.² .............................................. A61G 5/04
[52] U.S. Cl. .................................. 180/8 A; 280/5.2; 280/DIG. 10
[58] Field of Search ................... 180/9, 8 A, 5.2, 5.22, 180/5.24, 5.28, DIG. 10; 305/6

[56] References Cited

U.S. PATENT DOCUMENTS

| | | | |
|---|---|---|---|
| 468,022 | 2/1892 | Bray | 280/DIG. 10 |
| 3,259,200 | 7/1966 | Maijala | 280/5.22 X |
| 3,976,152 | 8/1976 | Bell | 280/DIG. 10 |

*Primary Examiner*—John A. Pekar

*Attorney, Agent, or Firm*—Harris, Kern, Wallen & Tinsley

[57] ABSTRACT

An improved step-climbing wheel chair with integral retractable ramps for ascending or descending a step, curb or the like. The conveyance is provided with a two-speed transmission capable of driving the wheel chair on level terrain at conventional speeds or selecting a low speed high torque capability for driving the conveyance up an inclined ramp.

The invention further contains a self-leveling chair seat which automatically maintains the occupant in a level seated position regardless of the inclined position assumed by the wheel chair frame, thereby contributing to the stability of the wheel chair and the safety of the occupant.

6 Claims, 7 Drawing Figures

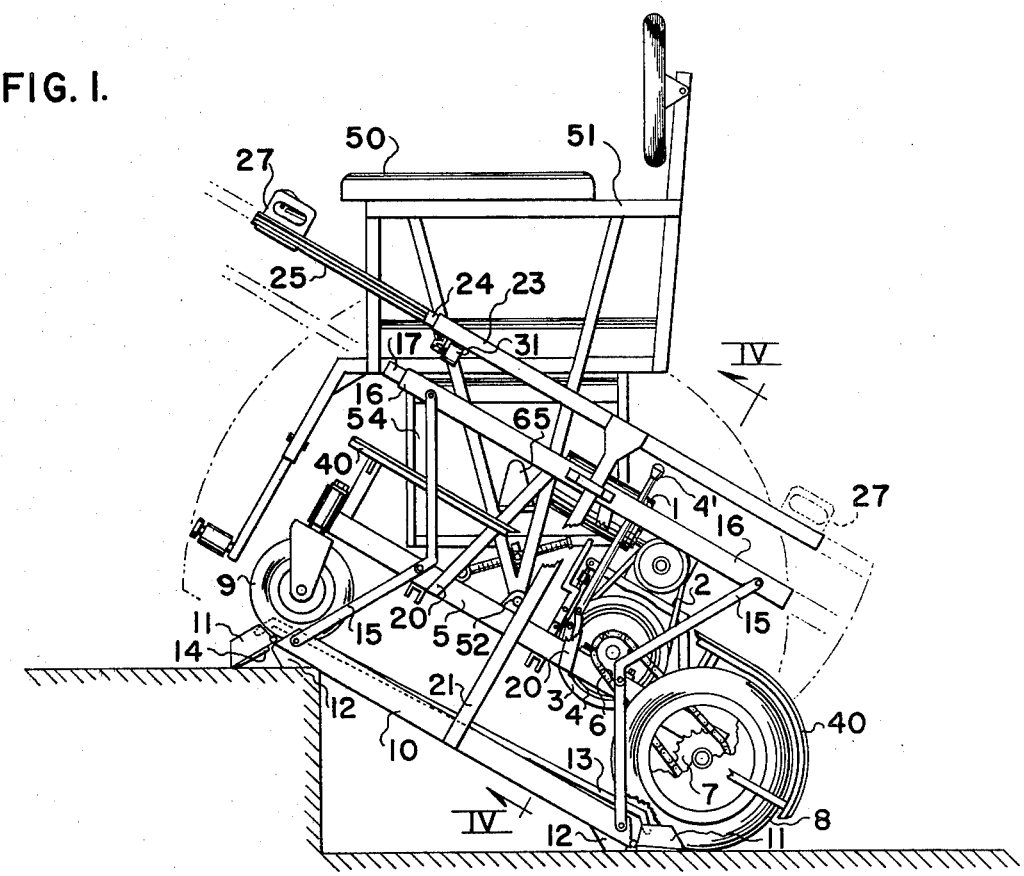
FIG. I.
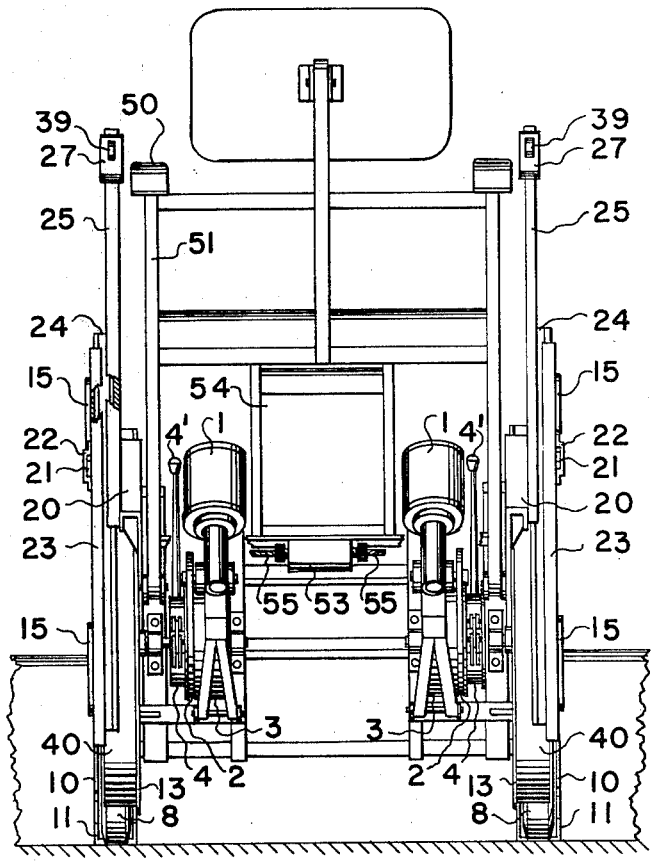
FIG. 2.

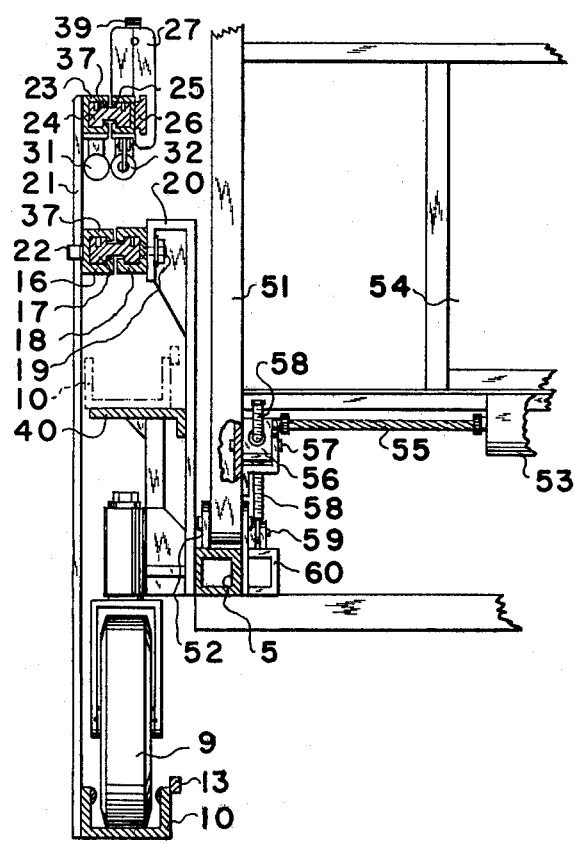
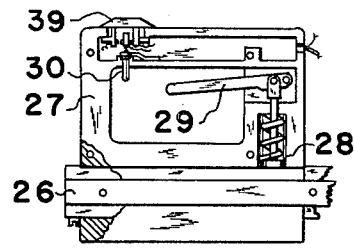
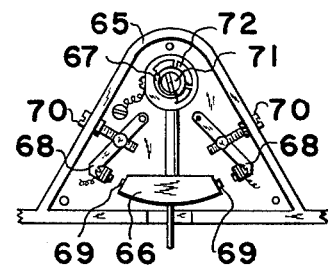
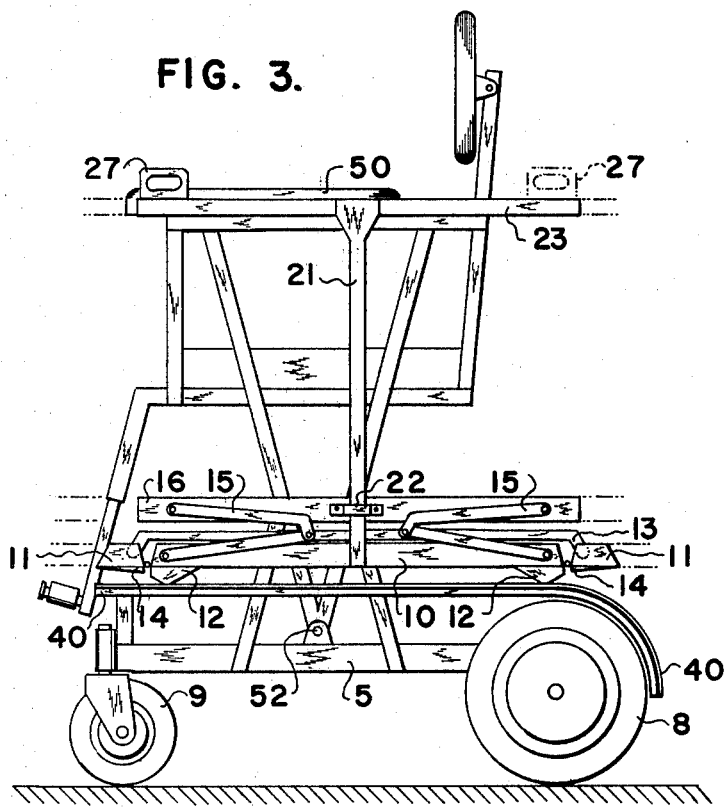
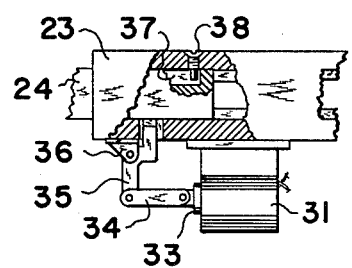

STEP-CLIMBING WHEEL CHAIR

REFERENCE TO RELATED DISCLOSURE

This invention is in part the subject of Disclosure Document No. 050052, filed June 11, 1976.

BACKGROUND OF INVENTION

This invention relates to a conveyance intended primarily for use by handicapped persons or invalids which are normally limited to travel on a level terrain.

The chief aim of the present invention is to provide a self-contained conveyance which will enable a handicapped person or invalid to cope safely with problems encountered in driving the conveyance into or out of an automobile, ascending or descending a street curb, a step or other obstructions which may be encountered at home, in a factory, or out-of-doors without the aid of an attendant, thus providing a freedom of mobility previously unknown to occupants of conventional wheel chairs.

SUMMARY AND OBJECTS OF INVENTION

A general object of the invention is to secure the foregoing advantages in a conveyance which is power driven with a minimum amount of exertion on the part of the seated occupant, for forward or rearward propulsion as well as making turns in one direction or the other within a turning circle equivalent to conventional wheel chairs.

Another object of the invention is to provide a two-speed transmission capable of driving the wheel chair on a level terrain at conventional speeds or selecting a low speed high torque capability for driving the conveyance up its inclined ramps into or out of a van-type automobile or other vehicles, ascending or descending a street curb or step.

Another object of the invention is to provide a ramp means that is slidingly and pivotally secured to the wheel chair frame and manually extended and inclined by the occupant in front of the castor wheels for ascending or descending an automobile floor board, a curb or step. After the castor and drive wheels traverse the said ramps, the ramps are manually retractable and placed in the traveling position above the castor and drive wheels until subsequently required. The traveling position of the ramps are housed slightly inboard of the wheels thus permitting the wheel chair to pass through narrow doorways without interference from the ramps.

The foregoing objects, advantages, features and results of the present invention, together with various other objects, advantages, features and results thereof which will be evident to those skilled in the art to which the invention relates in light of this disclosure, may be achieved with the exemplary embodiments of the invention illustrated in the accompanying drawings and described in detail hereafter.

DESCRIPTION OF DRAWINGS

In the drawings:

FIG. 1 is a side elevational view of the present invention, illustrating the conveyance ascending a curb by use of the retractable ramps.

FIG. 2 is a rear elevational view of the conveyance as it appears when viewed from the right of FIG. 1 in the curb ascending position.

FIG. 3 is a skeletal side elevational view of the conveyance illustraing the ramps in a folded position for traveling on level terrain.

FIG. 4 is an enlarged vertical section taken as indicated along the angled arrows IV—IV of FIG. 1 illustrating details of the retractable ramps and chair leveling means.

FIG. 5 is an enlarged fragmentary vertical view partly in section illustrating the hand control device.

FIG. 6 is an enlarged fragmentary vertical view partly in section illustrating the fixed and extendable control bars with solenoid brake means.

FIG. 7 is an enlarged fragmentary side elevational view of the pendulum activated switch for automatically energizing the chair stabilizing drive motor.

DESCRIPTION OF EXEMPLARY EMBODIMENT OF THE INVENTION

Referring to FIGS. 1, 2, and 3 of the drawings, the conveyance of the invention comprises a reduction gear motor 1 secured to frame 5. The motor 1 drives the belt 2, the latter in turn drives a two-speed planetary transmission 3. The transmission 3 provides a selective high speed drive for traveling on a level terrain and a low speed high torque means for driving the conveyance up an inclined ramp. Selective changes in speed are accomplished by activating a friction brake 4 by means of a hand lever 4' or a remote controlled solenoid (not shown). The transmission 3 drives chain 6 in turn drives the sprocket 7 and wheel 8. The castor wheel 9 is pivotally mounted to the frame 5. The mounting sleeve is positioned on the outboard side of frame 5 to permit the castor wheel 9 and the drive wheel 8 to be in direct longitudinal alignment in order to minimize the width of the channel bar ramp 10. The main ramp 10 is illustrated bridging a street curb with the lower auxiliary hinged ramp 11 positioned on the street level while the upper auxiliary hinged ramp 11 is positioned on the sidewalk level. The double faced slip resistant neoprene cleats 12 are secured to the lower surface of ramp 10. When the ramp 10 is inclined in the opposite direction for descending from the sidewalk to the street, the oppositely angeled face of the cleats 12 will become engaged with the sidewalk and street surfaces in the same manner as previously described. An equalizing bar 13 is pivotally connected to the inboard side of auxiliary ramps 11 thereby maintaining an equal angular relationship between the ramps 11, ramp 10 and the sidewalk and street surfaces. The foregoing arrangement facilitates positioning the ramps 10 and 11 respectively for ascending or descending from street level or vice versa. The slip resistant neoprene wedges 14 are secured to the lower surface of the auxiliary ramps 11. The wedges 14 are provided to assist the cleats 12 in opposing the force generated by the wheel chair drive means as the castor wheels 9 enter upon the ramps 11.

A pair of hinged levers 15 are pivotally connected to the outboard side of ramp 10 and the opposite ends of the levers 15 are pivotally connected to the longitudinally extendable ramp bar 16.

Referring now to FIG. 4 the ramp bar 16 is slidingly engaged to the "H" bar 17, the latter in turn is slidingly engaged to the fixed retainer bar 18, the latter in turn is pivotally secured to the fulcra bolt 19, the latter in turn is secured to the bracket 20, which in turn is secured to the frame 5. The above arrangement permits the ramps 10 to be positioned in front of the castor wheels 9, the conveyance to traverse the ramps 10 and retract the ramps 10 after the conveyance completes the transit of the ramps 10 for recycling in the previously described operation. The vertical positioning bar 21 is slidingly engaged between the bracket 22 and the ramp bar 16. The lower end of the positioning bar 21 is secured to the ramp 10 and the upper end is secured to the horizontally fixed handle bar 23. The above arrangement permits the operator to move the ramps 10 in a forward or rearward position and raise or lower the ramps 10 and to incline or decline the ramps 10 about the fulcra bolt 19. A similar movement of the ramp assembly occurs as the conveyance traverses the subject ramps 10. The handlebar 23 supports a slidingly engaged "H" bar 24, the latter in turn supports a slidingly engaged handle bar 25, the latter in turn has a "T" bar rail 26 secured thereto. The rail 26 supports a slidingly engaged control handle 27. The handle 27 is locked to the rail 26 by the means of a spring urged brake 28 (see FIG. 5). The brake is released by hand lifting the lever 29 thereby permitting the control handle 27 to slide to the rear end of the rail 26, which will facilitate positioning the ramps 10 in front of the castor wheels 9 when ascending or descending a curb or step. The control handles 27 are also provided with a pair of electrical SPDT switches 39, which in turn energize the independent motors 1 to effect a steering means and to drive the conveyance in a forward or rearward direction. The handles 27 further contain a solenoid control switch 30, which in turn energizes a pair of solenoids 31 and 32 (See FIGS. 4 and 6). The electrical wires connecting the switches 30 and 39 to their respective solenoids 31 and 32 and motors 1 are not shown but can be contained in a precoiled self-supporting cable with resilient helical coils having built-in memories biasing them in to contracted states when extended and released. The above arrangement provides electrical continuity as the ramps 10 are extended forward of the castor wheels 9 and as the conveyance traverses the ramps 10. The previously mentioned solenoids 31 and 32 are respectively secured to the underside of the fixed handle bar 23 and to the extendable handle bar 25. The following is a description of the solenoid 31 shown in FIG. 6. The armature 33 is pivotally connected to link 34, which in turn is pivotally connected to the brake lever arm 35, which in turn is pivotally mounted to bracket 36, the latter in turn is secured to the handle bar 23. When the solenoid actuated brake arm 35 is forced into contact with the slidable "H" bar 24, the "H" bar 24 becomes fixed in relation to the fixed handle bar 23. Likewise the simultaneous actuation of solenoid 32 will lock the extendable handle bar 25 to the "H" bar, thereby establishing a fixed relationship between the handle bars 23, "H" bar 24 and handle bar 25. The solenoid 32 is secured to the rear end of the handle bar 25 and the solenoid 31 is secured to the forward end of handle bar 23, thereby permitting the brake arms 35 to remain in contact with the "H" bar 24 regardless of the extendable or retractable positions of the bars 23, 24 and 25 in relation to each other. The "H" bars 17 and 24 are provided with dead ended grooves 37, which in turn receive the screw stops 38 to limit their respective travel in relation to the fixed bars 18 and 23 and also to the extendable bars 16 and 25.

The solenoid brakes 31 and 32 when energized will lock the handle bars 23 and 25 and permit the operator to extend the ramps 10 from the traveling position (to be explained later) in front of the castor wheels 9. De-energizing the solenoids 31 and 32 permit the handle bars 23 and 25 to become slidingly engaged in relation to each other permitting the operator to hold the control handles 27 in a comfortable position adjacent to the chair arms 50 (See FIGS. 1 and 2) as the conveyance tranverses the ramps 10. While traversing the ramps 10 the hand brake 29 of the control handle 27 is released permitting the handle 27 to slide to the forward end of rail 26. After the conveyance completes the transit of the ramps 10, the operator lifts the handle bars 23, 24 and 25 and the attached positioning bar 21 and the ramps 10, thus causing the hinged levers 15 to fold as shown in FIG. 3. The operator then pulls the folded ramps 10 up and over the fender 40 by means of the handle bars 23 and 25. In order to move the ramps 10 into a forward and traveling position, it will be necessary for the operator to make two or three pulling and retracting strokes of the handle bars 25 which is accomplished by alternatingly energizing the solenoids 31 and 32 and pulling forward one stroke, then de-energizing the solenoids 31 and 32, then sliding the handle bar 25 rearward and re-energizing the solenoids for an additional stroke forward until the ramps 10 are housed for traveling and are in position to be extended for recycling as previously described at the approach of the next curb or step.

Chair Stabilizing Assembly

A self-leveling chair 51 is pivotally connected at 52 to the frame 5 (See FIGS. 1, 2, and 4). A chair stabilizing motor 53 is secured under the battery box 54, the latter is secured to the chair 51. The motor 53 has a pair of flexible drive cables 55, which in turn drive gear nets 56. The gear nuts 56 are pivotally connected at 57 to the chair 51. The gear nuts 56 are threadably engaged to the threaded drive shaft 58, the latter in turn is pivotally connected at 59 to the brackets 60, which in turn is secured to frame 5 of the conveyance. The reversible motor 53 is energized by the stabilizing switch 65 (See FIGS. 1 and 7) which is secured to the chair 51. When the conveyance starts to ascend or descend the ramps 10, the pendulum 66 tends to stand in a vertical position while the chair 51, switch box 65 and the attached fulcra pin 67 tend to rotate about the pendulum 66 and will continue to rotate until one of the electrical contacts 68 engages a mating contact 69 which is secured to the pendulum 66 thus automatically energizing the motor 53 and driving the gear nuts 56 until the chair is returned to a level position and the contacts 68 and 69 become disengaged and stop the motor 53. The foregoing assembly will tend to maintain the chair in a level position regardless of the angle of inclination of the conveyance. The adjusting screws 70 are provided to alter the range between the contacts 68 and 69 to prevent short-cycling or excessive angular movement of the chair before the motor 53 is energized. An adjusting screw 71 and dampening washer 72 is provided to adjust the friction against the pendulum 66 thus restricting the pendulum from swinging too freely and causing the motor 53 to short cycle.

I claim as my invention:

1. In a wheel chair for ascending and descending a step, curb or the like, the combination of:
   a frame with castor wheels and drive wheels mounted thereon;
   a pair of elongate substantially flat ramps;
   a foldable, extendable and retractable ramp supporting assembly carrying said ramps and pivotally mounted on said frame;
   a self-leveling seat pivotally mounted on said frame;

a first power drive means interconnecting said chair and frame and automatically energized to maintain the said seat in a level position regardless of an inclined position assumed by said frame;

a control means carried on said ramp supporting assembly for extending, positioning, retracting and folding said ramps relative to said frame for traverse by said castor and drive wheels; and a second power drive means mounted on said frame and including a multi-speed transmission for driving said drive wheels on level terrain at conventional speeds and at a low speed with high torque up said ramps and functioning as a speed restraint while descending said ramp.

2. A wheel chair as defined in claim 1 wherein said ramp supporting assembly includes manually actuable control handles slidably mounted therein for moving generally parallel to said ramp.

3. A wheel chair as defined in claim 2 including brake means for locking said control handles relative to said ramp supporting assembly.

4. A wheel chair as defined in claim 3 including second control means carried on said control handles for controlling said second power drive means.

5. A wheel chair as defined in claim 1 wherein said seat is pivotally mounted on said frame at a pivot point below the seat whereby the seat is pivoted forwardly when the wheel chair is ascending and pivoted rearwardly when the wheel chair is descending.

6. A wheel chair as defined in claim 1 including auxiliary ramps pivotally mounted at and extending from each end of each of said ramps.

* * * * *